United States Patent [19]

Creager

[11] 4,340,023
[45] Jul. 20, 1982

[54] FUEL SUPPLY AND RETURN SYSTEM WITH BYPASS VALVE AND WATER PUMPOUT

[75] Inventor: John E. Creager, Linden, Mich.

[73] Assignee: General Motors Corporation, Detroit, Mich.

[21] Appl. No.: 162,005

[22] Filed: Jun. 23, 1980

[51] Int. Cl.³ .............................................. B67D 5/60
[52] U.S. Cl. .................................... 123/510; 123/511; 123/514; 137/846; 137/848; 137/590
[58] Field of Search ....................... 123/510, 511, 514; 137/846, 848, 850, 590, 592

[56] References Cited

U.S. PATENT DOCUMENTS

| | | | |
|---|---|---|---|
| 1,326,966 | 1/1920 | Reeves | 137/850 |
| 1,761,961 | 6/1930 | Arnold | 123/510 |
| 1,781,890 | 11/1930 | Wiltse | 123/510 |
| 2,353,269 | 7/1944 | Roth et al. | 123/510 |
| 3,872,886 | 3/1975 | Shotmeyer | 137/590 |
| 3,885,588 | 5/1975 | Shotmeyer | 137/590 |

4,084,606  4/1978  Mittleman ........................ 137/846

*Primary Examiner*—Raymond A. Nelli
*Attorney, Agent, or Firm*—D. D. McGraw

[57] ABSTRACT

A fuel system particularly useful with diesel fuel. The fuel is picked up through a fuel strainer system and pumped through a supply line to the engine. Excess fuel is returned to the fuel tank through a fuel return line. Since any water in the fuel separates from diesel fuel and settles in the bottom of the tank, the water must at times be removed. By extending the fuel return tube to the bottom of the tank a syphon tube is provided which can be connected to a pump to pump out the water. If the water in the bottom of the tank freezes, a bypass valve in the upper portion of the fuel return line, but within the tank, operates so that returned fuel may still be discharged in the tank. Two flexible bypass valve arrangements are shown, both using variations of a duckbill valve to provide a closed valve when syphoning or pumping of the water takes place.

3 Claims, 5 Drawing Figures

FUEL SUPPLY AND RETURN SYSTEM WITH BYPASS VALVE AND WATER PUMPOUT

The invention relates to a fuel supply and return system and more particularly to one designed to return excess diesel fuel to the fuel tank and to provide for the syphoning or pumping out of water from the bottom of the tank when sufficient water collects. A fuel supply and return system in which the invention may be incorporated is disclosed in U.S. patent application Ser. No. 146,479 now U.S. Pat. No. 4,304,664, filed May 5, 1980 and entitled, "Diesel Fuel In-Tank Strainer". Another related system is disclosed in U.S. patent application Ser. No. 104,308 now U.S. Pat. No. 4,296,723, filed Dec. 17, 1979 and entitled, "Engine Fuel System with Fuel/Water Separation". In the first noted application, a fuel supply line picks up fuel through a fuel strainer and the fuel is pumped to the engine. Excess fuel is returned through a return line extending into the top of the fuel tank and terminating shortly after entry into the tank. There is no provision shown in that application for removal of water which may collect in the bottom of the fuel tank. In the second mentioned application, a fuel and water separator system connects into the fuel return line between the engine and the fuel tank so that the water so separated is also returned to the fuel tank and collects in the bottom of the tank. When sufficient water has collected to warrant removing it, a water detector is actuated to warn the operator of this condition. The operator then manipulates a three-way valve which converts the tank end portion of the fuel return line to a pump-out line connected to a pump. The pump then removes the water from the bottom of the tank. To permit such removal, the end of the fuel return line terminates immediately adjacent the bottom of the fuel tank.

In the invention herein disclosed and claimed, a valve assembly is provided in the fuel return line adjacent the top of the fuel tank. The valve assembly may be connected to the fuel return line of the first noted application, or may be installed in the fuel return line of the second noted application immediately below the top of the fuel tank but within the tank. Two valve assemblies are disclosed and claimed. One of the valve assemblies has a housing with a duckbill valve at the bottom portion of the housing. The fuel return line has sections connected to a chamber in the housing at the top and at the side. Normally return fuel would flow in at the top and out through the side fuel return line section. If the side fuel return line section, which leads to the bottom of the tank, should be plugged for any reason, the returning fuel will open the duckbill valve and flow into the tank at a point near the top of the tank. When it is required that water be removed, a suitable arrangement is provided for syphoning or pumping out the water through the portions of the return line and the valve assembly within the fuel tank. This is schematically illustrated as including a three-way valve and a pump arrangement similar to that disclosed in the second application noted above. The valve will close off the connection between the engine and the fuel tank so that when the pump is energized, the pump will pull water from the bottom of the tank through the return line and valve assemblies. The duckbill valve will close due to differential pressure acting thereon.

The modified valve assembly has a circumferentially spaced group of duckbill-like valves around the portion of the fuel return line leading out of the valve assembly to the bottom of the fuel tank. The assembly operates in essentially the same manner as the first described valve assembly.

IN THE DRAWING

Figure 1:
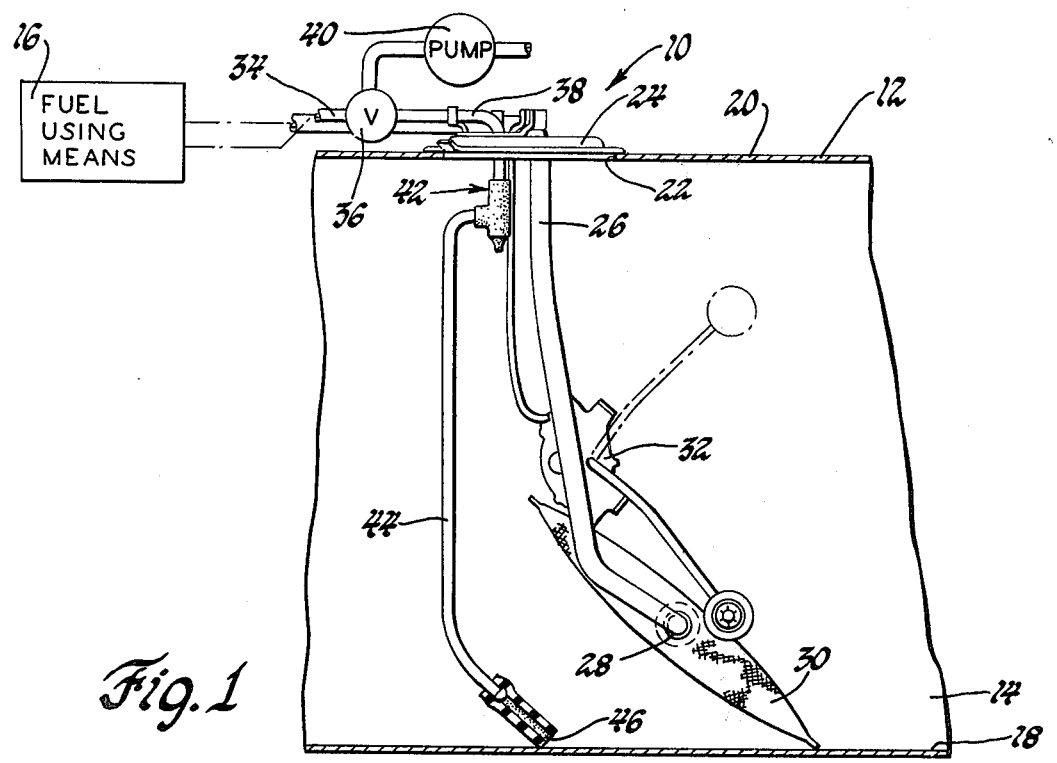
FIG. 1 is a somewhat schematic illustration of a system embodying the invention and having parts broken away and in section.

The fuel supply and return system 10 is illustrated as including a fuel tank 12, the interior 14 of which is designed to contain fuel for use in a fuel using means 16 such as a diesel engine. The tank interior is an enclosed volume defined by tank sides and the tank bottom 18 and tank top 20. The tank is illustrated as having an opening 22 in a portion of the tank top 20 to which a cover 24 is sealingly attached. The fuel supply line 26 extends through the cover 24, with the pick-up end 28 being positioned in the lower portion of tank interior 14 and having a fuel strainer assembly 30 attached thereto. The strainer assembly is the subject of the first noted application but forms no part of the invention herein claimed. A fuel level indicator sending unit 32 is also contained within tank interior 14. It is supported by fuel supply line 26 and has a connection through cover 24 so that the signal generated by the unit is transmitted to a fuel level gauge. A fuel return line 34 also extends through cover 24 and is connected with the fuel using means 16 so as to return excess fuel to the tank interior 14. A three-way valve 36 is schematically illustrated as being in the first fuel return line section 38 extending between the fuel using means 16 and the cover 24. A pump 40 is also schematically illustrated as being connected with valve 36. When the valve is in the usual position of use, the connection to pump 40 is closed and the fuel return line 34 is open between the fuel using means 16 and the tank interior 14. The valve 36 may be operated to close off the portion of the fuel return line 34 connecting valve 36 and the fuel using means 16 and to open the connection of the tank portion of fuel return line 34 to pump 40. This will be further described below.

A valve assembly 42 embodying the invention is connected to the end of the fuel return line first section 38 where that line section extends through cover 24 and into the tank interior 14 to a point immediately below the tank top 20. The valve assembly is illustrated in greater detail in FIG. 2. A second fuel return line section 44 is connected with the valve assembly 42 and leads downwardly through the tank interior so that its end provides an opening 46 immediately adjacent the tank bottom 18.

The valve assembly 42 includes a housing 48 formed to provide a chamber 50 therein. A first port 52 connects with chamber 50 and is arranged to receive the end 54 of the first fuel return line section 38. A second port 56 also connects with chamber 50 and is arranged to receive the end 58 of the second fuel return line section 44. Port 56 is preferably formed through a side wall of chamber 50 while port 52 is provided in the upper end of housing 48 so that it opens downwardly into chamber 50. The housing also includes an integrally formed duckbill valve 60 positioned at the lower end of the valve assembly housing and connecting with chamber 50 and the tank interior 14. The duckbill valve 60 is illustrated as having a pair of lips 62 and 64 formed of sufficiently flexible material and in such a manner that they are normally in light contact and the valve is closed. However, slightly higher pressure of fuel in chamber 50 relative to the pressure in tank interior 14 will cause the lips 62 and 64 to part so that the valve 60 will open and fuel can flow through the valve from chamber 50 into the tank interior 14. When there is a slightly lower pressure in chamber 50 than in the tank interior 14, the pressure differential holds lips 62 and 64 tightly closed so that no fuel, air, or fumes within the tank interior 14 can enter chamber 50 through valve 60 while pump 40 is running.

Under normal operating conditions more than enough fuel to operate the fuel using means 16 is picked up through the fuel supply line 26 and delivered to the fuel using means. The excess fuel is returned through the fuel return line 34 to the tank interior 14. Since it is not unusual for diesel fuel to have some water therein due to moisture condensation within the tank or for other reasons, a small amount of water is commonly separated from the fuel and located in the bottom of tank interior 14. So long as the temperature of the water is sufficiently high to maintain it in a liquid state this presents no problem insofar as fuel return is concerned. The fuel will flow through the valve assembly 42 and the second fuel return line section 44 to opening 46 and into the tank interior. However, opening 46 can become plugged under certain conditions. While it is unusual for it to become plugged because of foreign material other than fuel and water, it is more common that the water in the bottom of the tank may freeze in cold weather so that the opening 46 is closed by the ice. This is particularly true when the water level in the fuel tank is well above opening 46.

When opening 46 is plugged, the returning fuel cannot flow out of the second fuel return line section 44 into the tank. Therefore the valve assembly 42 operates to permit the return of fuel to the tank interior 14. The fuel being returned is under sufficient pressure so that the pressure builds up in chamber 50 to open valve 60. The fuel being returned then flows directly into the tank interior 14 through valve assembly 42. The valve assembly therefore obviates any problem of fuel return flow.

When there is sufficient water in the bottom of tank 12 so as to make its removal desirable, a water detector mechanism such as that generally disclosed in the second application may be provided to warn the operator. Also, removal of water may be done on a periodic basis. Water removal is accomplished by using the second fuel return line section 44 as a water removal tube. While the water can be syphoned, it is more easily and quickly removed by the construction schematically illustrated. Valve 36 is operated to provide a connection between fuel return line section 44 and pump 40 while closing off the connection from the valve 36 to the fuel using means 16. Pump 40 is then energized to pump out the water. This is accomplished by applying suction through valve 36, the portion of the first fuel return line section 38 between valve 36 and valve assembly 42, valve chamber 50 and the second fuel return line section 44. This removes the water from the bottom of the tank interior 14 through opening 46. The pumping action may continue until a water detector indicates that substantially no water is left in the tank or until the pump begins to discharge fuel instead of water. The pump is then shut off and valve 36 is returned to its usual position. During the pumping action, valve 50 remains closed due to the differential pressure acting thereon so that the pump must receive the water from the bottom of the tank interior through opening 46.

Figures 2, 3, 4, 5:
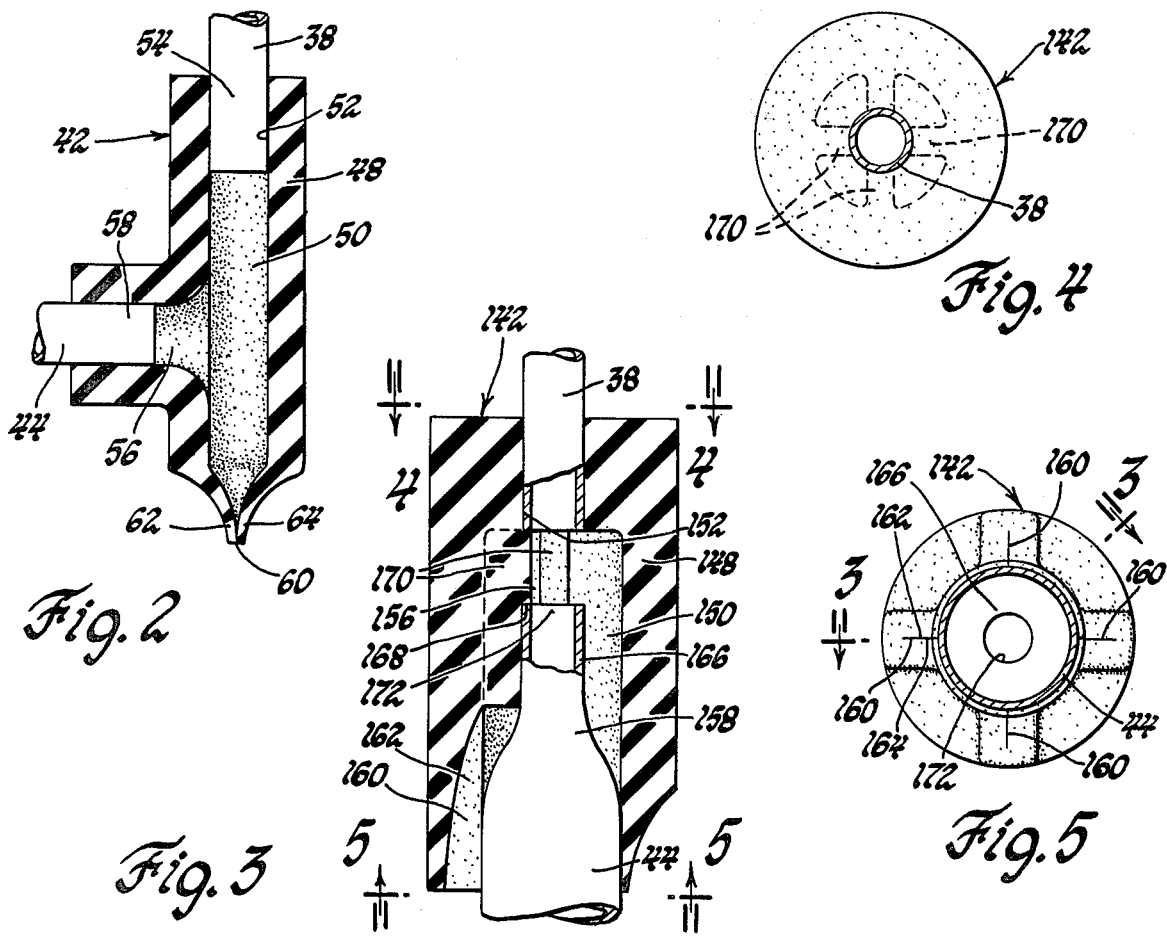
FIG. 2 is an enlarged cross section view of the valve assembly of FIG. 1 embodying the invention.
FIG. 3 is a cross section view with parts broken away of a modified valve assembly embodying the invention.
FIG. 4 is a view of the valve assembly of FIG. 3 taken in the direction of arrows 4—4 of that Figure.
FIG. 5 is another view of the valve assembly of FIG. 3 taken in the direction of arrows 5—5.

A modified valve assembly 142 is illustrated in FIGS. 3, 4 and 5. Valve assembly 142 is connected to the first fuel return line section 38 by means of a first port 152, and the port opens into a chamber 150 formed within the housing 148. In the modified valve assembly, the second fuel return line section 44 has its upper end 158 extending into the bottom portion of housing 148 and then necked down as shown at 166. The edge of the upper end 158 seats underneath shoulder sections 168 formed on circumferentially spaced ribs 170 formed within chamber 150. The ribs grip line section upper end 158 while permitting fluid to flow through chamber 150. Thus return fuel may flow from section 38 into chamber 150 and into the opening 172 of the upper end of the necked portion 166 of fuel return line section 44. The shoulder sections 168 and the portions of the ribs 170 holding the necked portion 166 centrally in place may be considered to be a second port 156 formed as a part of housing 148 and receiving the end 158 of the second fuel return line section 44.

The lower portion of housing 148 and chamber 150 through which the second fuel return line section 44 extends is formed to provide a series of circumferentially spaced duckbill-like valves 160 which fit closely about line section 44 and have their lips 162 and 164 normally closed in a manner similar to valve 60 of FIG. 2. During normal fuel return operation, valves 160 will remain in the position shown and fuel entering the valve assembly 142 through port 152 will pass through at least the upper part of chamber 150 and into the second fuel return line section 44 through its opening 172. If the opening 46 at the bottom of the fuel tank is closed or so restricted that the return fuel cannot readily flow through it into the tank interior 14, the pressure build-up in chamber 150 will be sufficient to open valves 160 and the return fuel will flow out of chamber 150 through those valves and into the tank interior 14 without passing through the second fuel return line section 44. When water is to be removed from the bottom of the tank and valve 36 is operated accordingly, pump 40 will remove the fuel and the differential pressure between chamber 150 and tank interior 14 will assure that valves 160 are closed in the same manner of operation as valve 60 above described.

The embodiments of the invention in which an exclusive property or privilege is claimed are defined as follows:

1. In a fuel supply and return system having a fuel tank, a fuel supply line for removing fuel from the tank for use in an engine or the like, and a fuel return line for returning excess fuel to the tank, the fuel return line also being adapted to remove water from the fuel tank under certain operational conditions, said fuel return line including a first line section extending into the top of the fuel tank, a second line section extending from near the top of the fuel tank to a point adjacent the bottom of the fuel tank, and a valve assembly connecting said first and second line sections, the improvement comprising:

said valve assembly including a housing having a chamber formed therein, a first port continuously fluid connected with said first line section and continuously opening into said chamber, a second port continuously fluid connected with said second line section and continuously opening into said chamber, and a normally closed duckbill-like valve formed at least in part by said housing and so communicating with said chamber that said valve will open at a predetermined positive pressure in said chamber to permit fuel flow from said chamber directly into the fuel tank when said second line section is sufficiently restricted to cause fuel returning to build up said predetermined positive pressure, and that said valve will remain closed with negative pressure in said chamber to permit water in the bottom of the tank to be removed through said second line section and said chamber and said first line section under said certain operational condition.

2. In the fuel supply and return system of claim 1, said improved valve assembly further comprising:

said housing forming said first and second ports and said valve, and being so formed that said first port and said chamber and said valve are aligned, said second port being formed through a side of said housing and opening into said chamber intermediate said first port and said valve, said valve being positioned below said ports.

3. In the fuel supply and return system of claim 1, said improved valve assembly further comprising:

said housing being so formed that said first port and said chamber and said second port and said valve are aligned, said valve being positioned below said ports, said second port being formed by a reduced end of said second line section portion extending within said chamber, said second line section including a part adjacent to said reduced end and extending through said valve so that the outer surface thereof cooperates with said valve, said valve including a plurality of flexible lips formed as parts of said housing and circumferentially arranged about the part of said second line section extending through said valve, said lips fitting closely to the outer surface of said second line section in a normally closed valve relation and movable away from the outer surface of said second line section to permit flow out of said chamber through said valve around said second line section when said valve is subjected to the aforesaid predetermined positive pressure in said chamber.

* * * * *